United States Patent [19]
Pagliarini, Jr. et al.

[11] 4,384,351
[45] May 17, 1983

[54] FLEXTENSIONAL TRANSDUCER

[75] Inventors: John A. Pagliarini, Jr., Nashua; Ronald P. White, Amherst, both of N.H.

[73] Assignee: Sanders Associates, Inc., Nashua, N.H.

[21] Appl. No.: 968,158

[22] Filed: Dec. 11, 1978

[51] Int. Cl.[3] .............................................. H04B 13/00
[52] U.S. Cl. .................................... 367/175; 367/153; 367/163; 367/168
[58] Field of Search ............................. 340/10, 11, 12; 367/157, 159, 160, 161, 163, 168, 174, 175, 153, 155, 156

[56] References Cited

U.S. PATENT DOCUMENTS

| | | | |
|---|---|---|---|
| 2,063,950 | 12/1936 | Steinberger | 340/9 |
| 2,977,573 | 3/1961 | Mott | 367/175 |
| 3,121,212 | 2/1964 | Weber et al. | 340/12 |
| 3,274,537 | 9/1966 | Toulis | 340/8 R |
| 3,277,433 | 10/1966 | Toulis | 340/10 |
| 3,466,017 | 9/1969 | Malvin | 340/14 X |
| 3,470,402 | 9/1969 | Abbott | 340/11 X |
| 3,538,494 | 11/1970 | Erickson | 340/12 R |

*Primary Examiner*—Harold J. Tudor
*Attorney, Agent, or Firm*—Louis Etlinger; Ronald Reichman

[57] ABSTRACT

A magnetic drive is provided for a flextensional transducer in order to adapt the flextensional transducer for operation at increased ocean depths without the necessity of liquid filling and complex decoupling devices. In one embodiment an electro-magnetic actuator is positioned between the walls of the flextensional shell and is driven electrically so as to deflect the shell walls outwardly. The magnetic actuator in one embodiment includes a permanent magnet and pole pieces supported on one of the interior walls of the shell, with a moving coil positioned between the pole pieces and supported on a diametrically opposite wall of the shell. In an alternative embodiment, the magnetic actuation may be in the form of a rod of magnetostrictive material between opposing interior walls of the shell, which is actuated by an overwound electrical coil, with the shell being of magnetic material such as magnetic iron.

2 Claims, 3 Drawing Figures

FLEXTENSIONAL TRANSDUCER

FIELD OF INVENTION

This invention relates to electro-mechanical transducers and more particularly to a so-called flextensional transducer in which the flextensional transducer shell is driven by magnetic actuation means located interiorly of the shell and which coacts with opposing interior walls of the shell to move them outwardly.

BACKGROUND OF THE INVENTION

Flextensional transducers such as those illustrated in U.S. Pat. Nos. 3,274,537 issued Sept. 20, 1966, and U.S. Pat. No. 3,277,433 issued Oct. 4, 1966, to W. J. Toulis in general are characterized by a flexible outer shell and a piezoelectric stack of elements used in a length expander mode which is placed between opposing interior walls of the shell. When actuated, the stack expands and contracts, thereby flexing the shell which, in turn, is coupled to an acoustic medium so as to project acoustic energy into the water.

While these types of transducers are exceptionally efficient, the performance of the transducers varies with depth and is limited in maximum depth by the amount of prestress that can be imposed on the piezoelectric stack to avoid exposure to tensile stress.

As is well known, piezoelectric properties of ceramic transducers vary with stress, with the stress varying as a function of the depth of the transducer in water, since increased hydrostatic pressures cause increased shell deflection. Thus, the characteristics of the transducer are variable with depth and, in general, the maximum depth of operation of the piezoelectrically driven flextensional transducer is governed by allowable ceramic stress and performance degradation. In part, hydrostatic pressure may be compensated for by filling the shell of the flextensional transducer with liquid. However, liquid filling requires complex decoupling devices, and this is generally undesirable due to the effect of the liquid fill on the transducer characteristics.

The problem of driving a flextensional transducer at increased ocean depths is solved in subject invention by the utilization of a magnetically driven element, which, in one embodiment, employs a moving coil in a magnetic field. This device is used in place of the piezoelectric stack and is, in general, located between opposing interior walls of the flextensional transducer's shell. In one embodiment, a permanent magnet and pole pieces are mounted to one interior wall, with the moving coil mounted to a diametrically opposite interior wall. The shell is driven by energizing the coil which causes the coil to move toward or away from the pole pieces thereby flexing the walls of the transducer inwardly or outwardly. For elliptical shells, the magnetically driven element may lie either along the major or minor axis. With electrodynamic drive, the minor axis is preferred because the coil is a low impedance drive and the shell in this direction also has a low impedance, offering a good match for maximum power transfer to the medium. Location along the minor axis also facilitates alignment and ease of fabrication because of the shorter distance between the interior walls.

The advantage of utilizing such a magnetically driven element is that there is no variation of performance with depth because the driving element is not subjected to depth dependent stresses. This is because the drive coil is free to move with respect to the pole pieces which surround it in response to the flexure of the walls of the transducer due to hydrostatic pressure increases with increasing depth. To insure linear drive characteristics the coil length is extended beyond the gap sufficiently to accommodate shell deflection at maximum depth.

In an alternative embodiment, the magnetically actuated device may include a magnetostrictive rod placed between opposing interior walls of the shell in which the magnetostrictive rod is overwound with an electrical coil. When energized, this coil causes the magnetostrictive rod to expand and contract in a longitudinal direction thereby causing flexure of the shell. It should be noted that for magnetostrictive rods, pressures at the ends of the rod do not cause the same distortion in molecular alignment as created in a ceramic material, such that transducer parameters are not affected by the increased hydrostatic pressures at increasing ocean depths. In addition, since metals perform equally well in tension as compression the need for prestress of the stack has been removed, extending depth capability of the shell.

It is therefore an object of this invention to provide an improved flextensional transducer;

It is still further object of this invention to provide a magnetic drive for a flextensional transducer;

It is another object of this invention to provide a drive for a flextensional transducer which is depth independent and in which the driving element is either not subjected to stress due to depth or is relatively insensitive to depth related stress;

It is another object of this invention to provide a depth independent response characteristic for a flextensional transducer.

These and other objects of the invention will be better understood in connection with the appended drawings and the following detailed description wherein

DETAILED DESCRIPTION

Figure 1:
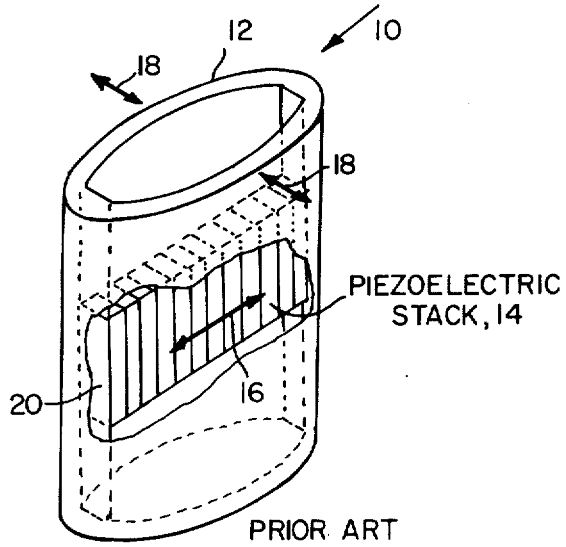
FIG. 1 is a sectional and diagrammatical illustration of a prior art flextensional transducer illustrating the driving of this transducer with a piezoelectric stack.

By way of further background, and in conjunction with FIG. 1, a flextensional transducer 10 is generally an electro-mechanical transducer adapted to generate and radiate or detect sound in a fluid medium. The transducer has a diaphragm or compliant tube shell 12 which operates in the flexural mode of vibration and a driver in the form of a piezoelectric stack 14 for vibrating the shell. The driver operates in the extensional mode as indicated by double-ended arrow 16 to cause the shell to flex as illustrated by double-ended arrows 18. The piezoelectric stack is thus mounted in thrust transmitting relationship to the shell and is adapted to operate in the longitudinal or extensional mode to impart to the shell the desired flexural vibrational motions.

In the illustrated embodiment the compliant tube shell is elliptical in cross-section although circular cross-sections may be used if desired. While the vibrational modes are different with different shell configurations, the principle of operation is the same.

As pointed out, hydrostatic pressures at increased ocean depths are transmitted to the stack and cause a non-linear response with depth. In the elliptical configuration, increasing hydrostatic pressure decreases the pressure on the ends 20 of stack 14, thereby altering the prestressed condition of the stack.

For circular cross-sections, increased hydrostatic pressure with depth increases the pressure on the ends of the stack and thus alters the prestressed condition of the stack.

In either case, the frequency response of the transducer is non-linear with depth and is not acceptable in some applications. In order to compensate for the increased hydrostatic pressure, oil or other non-compressible liquid may be added to the shell interior. This introduces a coupling loss between driver shell and medium.

The problem of dealing with increased hydrostatic pressures is solved in the subject invention by utilizing an electromagnetically driven driving element in which either the driver is not subjected to hydrostatically generated forces, or if it is, the driver characteristics do not change with longitudinally applied forces.

Figure 2:
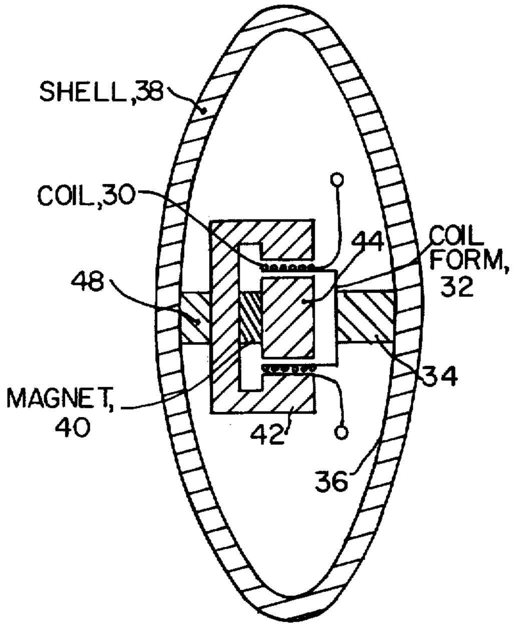
FIG. 2 is a sectional diagram of a flextensional transducer illustrating a moving coil magnetically driven actuating element for the flextensional transducer shell.

In one embodiment, as illustrated in FIG. 2, a moving coil 30 is wound on coil form 32, is supported at 34 on an interior wall 36 of a compliant tube shell 38. In this case, the shell has an elliptical cross-section. On a diametrically opposite portion of wall 36 is mounted a permanent magnet 40 having pole pieces 42 and 44 which acommodate the moving coil therebetween. The fixed magnet structure is supported at 48 such that the magnetically driven assembly lies along the minor axis of the ellipse.

An oval or elliptical shape for flextensional transducers is preferred because the amplitude of deflection of the diaphragm-like flat sides is greater than that of the ends by the ratio of major to minor axes of the oval. The radiating area of the diaphragms is also much larger than the shell ends. As a result, most of the radiation of acoutic energy occurs from the diaphragm surfaces, with very little from the ends. With this configuration, there is also a good acoustic impedance match to the water, giving wider bandwidth for a given transducer volume.

It will, of course, be appreciated that the moving coil drive unit may be located along the major axis of shell 38 to obtain the desired operation. As illustrated, its location along the minor axis of shell 38 provides that the extension of the moving coil drive unit produces diaphragm flexing directly. The diaphragm motion is the same as that for major axis drive in that the motion of the diaphragms and the end portions of the shell are the same.

Figure 3:
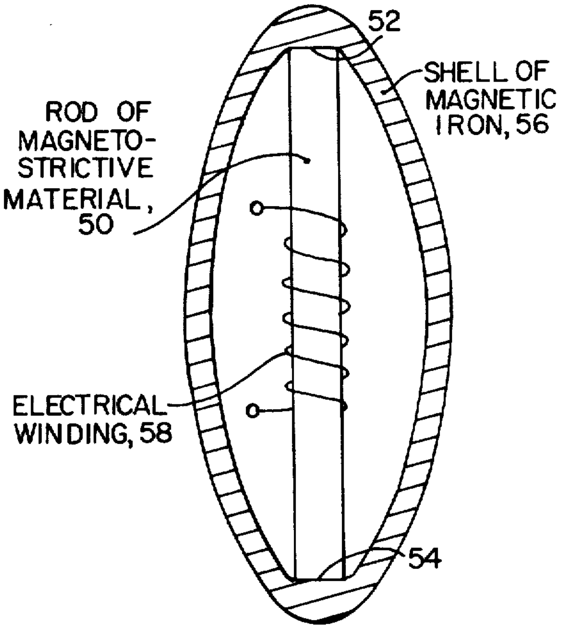
FIG. 3 is a cross-sectional diagram illustrating the utilization of a magnetostrictive rod and electrically actuated coil for the driving of a flextensional transducer shell.

Referring to FIG. 3, a magnetic drive may be effected by positioning a magnetostrictive rod or bar 50 between opposing interior faces 52 and 54 of a shell 56 made of magnetic material such as iron. The rod is mounted in compression between opposing shell walls and is overwound with a coil or electrical windings 58, which when energized causes the rod to expand or contract in the longitudinal extensional direction. Since the molecular structure of the rod does not change significantly for the pressures involved, the magnetostrictive rod is considerably less sensitive to increased hydrostatic pressure than is the piezoelectric stack. Linearity of frequency response and low impedance result from the use of this configuration.

While the shell need not be of a magnetic material, this is desirable to complete magnetic circuits. The efficiency of the magnetostrictive rod can be increased through the use of rare earth materials.

Positioning of the rod along the minor axis of the shell results in the same type direct shell drive as illustrated for the moving coil embodiment of FIG. 2.

It will be appreciated that although the subject flextensional transducer has been described in terms of a drive mode in which the transducer acts as a projector of acoustic energy, it may also be used as a reciprocal device for receiving acoustic energy. As such the electromagnetic transducer, be it of the moving coil design or of the magnetostrictive rod design, either is driven by electrical signals in the projecting mode or produces electrical signals corresponding to received acoustic signals in the receive mode.

In general, therefore, what has been provided is a flextensional transducer shell having in cross section a closed geometric shape, in which an electromagnetic transducer is positioned between opposing interior walls of the shell. Because of the electromagnetic drive, linearity is preserved at increased ocean depths, a feature which is most desirable in a great many applications. Alternatively, what has been provided is a method of adapting a flextensional transducer for operation at increased ocean depths in which an electromagnetic transducer is employed.

Although preferred embodiments of the invention have been described in considerable detail for illustrative purposes, many modifications will occur to those skilled in the art. It is therefore desired that the protection afforded by Letters Patent be limited only by the true scope of the appended claims.

We claim:

1. A flextensional transducer that is capable of operating at widely varying ocean depths, said transducer comprising:

a shell defining in cross section a closed geometric structure, said shell having opposing interior walls; and an electromagnetic transducer which includes a permanent magnet and pole pieces supported on one of said opposing interior walls and a coil positioned for movement between said pole pieces and supported on a diametrically opposite interior wall, for either driving said walls in a flexural mode thereby to deflect said walls in accordance with electrical signals or for converting motion of said walls into electrical signals, whereby any deflection of said shell due to hydrostatic pressure does not effect the performance of said transducer.

2. The flextensional transducer of claim 1, wherein said shell has an oval cross-section including major and minor axes, and wherein said electromagnetic transducer is positioned along the minor axis of said shell.

* * * * *